United States Patent
Yuhara

(10) Patent No.: US 10,683,118 B2
(45) Date of Patent: Jun. 16, 2020

(54) ANVIL AND ULTRASONIC SEALING APPARATUS

(71) Applicant: TOPPAN PRINTING CO., LTD., Tokyo (JP)

(72) Inventor: Noritaka Yuhara, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/295,523

(22) Filed: Mar. 7, 2019

(65) Prior Publication Data

US 2019/0202587 A1     Jul. 4, 2019

Related U.S. Application Data

(63) Continuation of application No. PCT/JP2017/031842, filed on Sep. 4, 2017.

(30) Foreign Application Priority Data

Sep. 13, 2016    (JP) .................................. 2016-178450

(51) Int. Cl.
    *B32B 7/00*          (2019.01)
    *B65B 51/22*       (2006.01)
    (Continued)

(52) U.S. Cl.
    CPC ............ *B65B 51/225* (2013.01); *B29C 65/08* (2013.01); *B29C 65/7451* (2013.01); *B29C 66/1122* (2013.01); *B29C 66/346* (2013.01); *B29C 66/4312* (2013.01); *B29C 66/72328* (2013.01); *B29C 66/7373* (2013.01); *B29C 66/73921* (2013.01); *B29C 66/81427* (2013.01); *B29C 66/81431* (2013.01); *B29C 66/81463* (2013.01); *B29C 66/8491* (2013.01); *B31B 50/66* (2017.08); *B65B 7/16* (2013.01);
    (Continued)

(58) Field of Classification Search
    CPC ....... B65B 51/225; B31B 50/66; B29C 65/08; B29C 66/4312; B29C 66/72328; B29C 66/8491
    USPC ...................................................... 156/580.1
    See application file for complete search history.

(56) References Cited

FOREIGN PATENT DOCUMENTS

EP           1066951      * 10/2001
JP         2001-018924 A     1/2001
    (Continued)

OTHER PUBLICATIONS

International Searching Authority, "Written Opinion," issued in connection with International Patent Application No. PCT/JP2017/031842, dated Oct. 3, 2017.

*Primary Examiner* — James D Sells
(74) *Attorney, Agent, or Firm* — Foley & Lardner LLP

(57) ABSTRACT

An anvil is provided in an ultrasonic sealing machine, in which vibration applying surfaces of a pair of horns and an abutment surface on an end face of the anvil cooperate with each other to bond a laminate. The abutment surface includes left and right welding surfaces which are disposed in the extending direction of the vibration applying surface and protrude toward the horns to face two vibration applying surfaces. The left and right welding surfaces each have an area per unit length in the extending direction, which continuously or step-wisely increases with an increase in distance from a center of the seal area, which is a region where the two vibration applying surfaces are adjacent to each other.

3 Claims, 7 Drawing Sheets

(51) Int. Cl.
    *B29C 65/08*           (2006.01)
    *B31B 50/66*           (2017.01)
    *B29C 65/00*           (2006.01)
    *B29C 65/74*           (2006.01)
    *B65B 7/16*            (2006.01)
    *B29L 31/00*           (2006.01)

(52) U.S. Cl.
    CPC ............ *B65B 51/22* (2013.01); *B29C 65/081* (2013.01); *B29C 66/81419* (2013.01); *B29C 66/81425* (2013.01); *B29L 2031/7166* (2013.01)

(56) References Cited

FOREIGN PATENT DOCUMENTS

| | | | |
|---|---|---|---|
| JP | 3904675 | B2 | 4/2007 |
| JP | 4093775 | B2 | 6/2008 |

\* cited by examiner

FIG. 6A
FIG. 6B
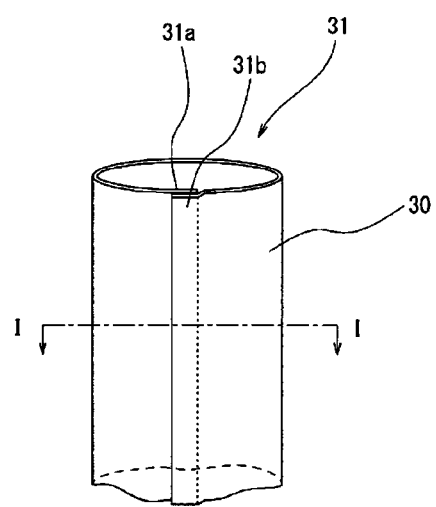
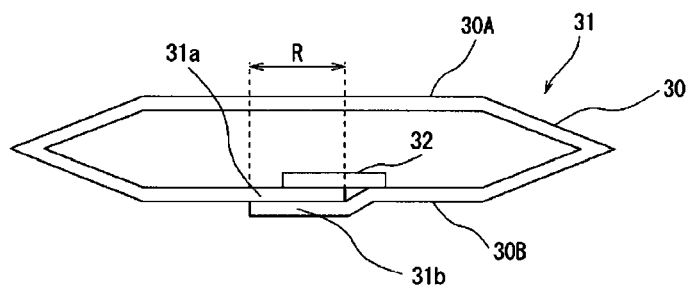

ANVIL AND ULTRASONIC SEALING APPARATUS

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/031842, filed on Sep. 4, 2017, which is based upon and claims the benefit of priority to Japanese Patent Application No. 2016-178450, filed on Sep. 13, 2016; the disclosures of which are all incorporated herein by reference in their entireties.

TECHNICAL FIELD

The present invention relates to a technique concerning an ultrasonic sealing apparatus for bonding a laminate of two or more sheets at a strip-shaped sealing position. More particularly, the invention relates to a technique suitable for transversely closing (ultrasonic sealing) tubular shaped laminates of packaging material which constitute paper containers that accommodate liquids or solids.

BACKGROUND ART

Paper containers for liquids are widely used as convenient containers for accommodating liquid beverages such as fruit beverages, tea, coffee, milk beverages and soup, and alcoholic drinks such as sake and shochu. Examples of the shape of the paper containers for liquids include a gable-top shape, a brick shape, and a cylindrical shape.

For example, in production of a brick-shaped container, scores for containers are formed on a packaging material, which is composed of a paper layer and a thermoplastic resin layers disposed on the front and back surfaces of the paper layer, and an edge protection tape is adhered to an end portion of the packaging material. Then, the packaging material is formed into a tubular shape, and the end portions of the packaging material are overlapped and bonded to each other to form a tubular shaped packaging material. The lower end of the tubular shaped packaging material is transversely bonded to thereby seal the lower end of the container. Subsequently, after the tubular shaped packaging material is filled with contents, a spout position (upper end) of the container is sealed and severed in a transverse direction by a liquid-pouch sealing technique. Then, the packaging material is formed into a three-dimensional shape, which is a final product shape.

The tubular packaging material is sealed in the transverse direction by using an ultrasonic sealing apparatus, for example, as disclosed in PTL 1.

That is, in the ultrasonic sealing apparatus, a sealing position of the container is pressed between an end face of a horn and an end face of an anvil, which face each other. As the horn transmits ultrasonic vibrations to the packaging material, thermoplastic resin on the surface of the packaging material is melted for seal by heat generated at the interface of the package material (at a position where surfaces of the overlapped sheet members are in contact with each other). In particular, the sealing state of the container for liquids is of importance, and the sealing described above requires a strength sufficient to protect the contents and withstand transport and drop impact.

Further, when a seal length is long, the seal length is covered by using a pair of horns (converter heads) juxtaposed as shown in FIG. 10 of PTL 2. In this case, a bonded portion of the tubular shaped packaging material, in which end portions are overlapped with each other, is positioned in a gap between the pair of horns, and the bonded portion has a relatively increased thickness. Accordingly, in the technique disclosed in PTL 2, a recess is formed on an anvil at a position corresponding to the gap between the pair of horns.

CITATION LIST

[Patent Literature] PTL 1: JP 4093775 B2; PTL 2: JP 3904675 B2 (FIG. 10)

SUMMARY OF THE INVENTION

Technical Problem

When an ultrasonic sealing machine having a pair of juxtaposed horns is used, each of the pair of horns tends to be inclined leftward and rightward, assuming an inverted V-shape about the bonded portion having a relatively increased thickness serving as a fulcrum (see FIGS. 8A and 8B) even if a recess is formed on an anvil as described in PTL 2. Here, a seal surface pressure is preferably uniform. However, when a pair of horns are inclined into an inverted V-shape, ultrasonic welding is performed while excess pressure is applied to both ends of a welded area (seal area) of the tubular shaped packaging material to be welded by ultrasonic waves. As a consequence, melted thermoplastic resin may be unduly extruded at both ends, which may cause poor welding.

The present invention has been made in view of the above issue, and has an object to improve sealing properties of the seal area by devising the shape of an anvil in an ultrasonic sealing technique using a pair of horns.

Proposed Solution to the Problem

In order to improve or even solve the problem, an aspect of the present invention is an anvil in an ultrasonic sealing machine, in which a pair of horns each having a strip-shaped vibration applying surface formed on an end face are arranged in an extending direction of the vibration applying surface, and the vibration applying surfaces of the pair of horns and a welding surface on an abutment surface formed on an end face of the anvil cooperate with each other to clamp a laminate composed of two or more sheet members having a thermoplastic resin layer so as to melt the thermoplastic resin in the sheet members by using ultrasonic vibration transmitted to the vibration applying surfaces to thereby bond the laminate, wherein the welding surface includes left and right welding surfaces which are disposed in the extending direction of the vibration applying surface, and each protrude toward the horns to face the corresponding vibration applying surfaces on the pair of horns, and the left and right welding surfaces have an area per unit length in the extending direction, which continuously or stepwisely increases with an increase in distance from a center of a seal area, which is a region where the vibration applying surfaces of the pair of horns are adjacent to each other.

Desired Advantageous Effects of Invention

According to an aspect of the present invention, even if a pair of horns are inclined into an inverted V-shape about the bonded portion serving as a fulcrum at the center of the seal area having a relatively increased thickness, an increase in surface pressure on both ends of the seal area is reduced compared with a conventional art to thereby reduce an amount of thermoplastic resin melted and extruded at both ends. As a result, sealing properties are improved.

BRIEF DESCRIPTION OF THE DRAWINGS

FIGS. 6A and 6B are a set of views illustrating a tubular packaging material, in which 6A is a perspective view, and 6B is a cross-sectional view taken along the line I-I of 6A.

DESCRIPTION OF REPRESENTATIVE EMBODIMENTS

Figure 1:
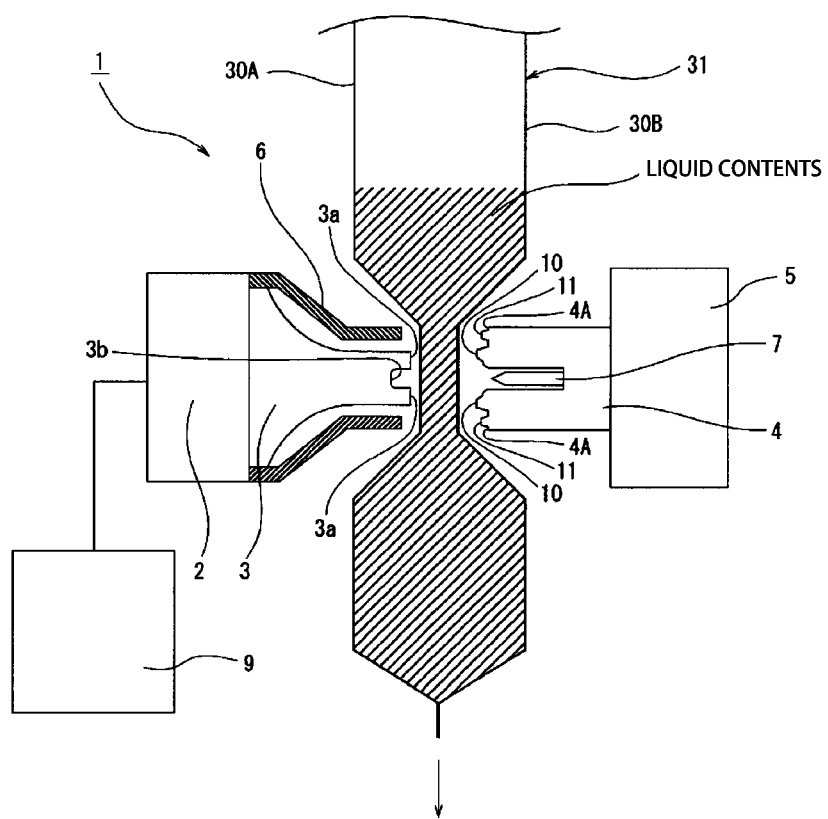
FIG. 1 is a schematic side view illustrating an ultrasonic sealing apparatus of an embodiment of the present invention.

With reference to the drawings, a description will now be given of embodiments of the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. The same constituent elements are denoted by the same reference numerals unless there is a reason for the sake of convenience, and redundant description is omitted. In the drawings referred to in the following description, for clarity, characteristic parts are enlarged, and thus the components are not shown to scale.

As shown in a schematic view of FIG. 1, an ultrasonic sealing apparatus 1 includes an ultrasonic generator 9, a converter 2 which is an ultrasonic transducer, a pair of horns 3 (only one horn 3 is shown in FIG. 1) and an anvil 4. Reference sign 5 indicates a jaw that supports the anvil 4. Reference sign 6 indicates a horn cover that protects the pair of horns 3.

The converter 2 converts electric power supplied from the ultrasonic generator 9 into ultrasonic vibration, and transmits the generated ultrasonic vibration to the pair of horns 3 so that ends of the horns 3 produce ultrasonic vibration.

Figure 2:
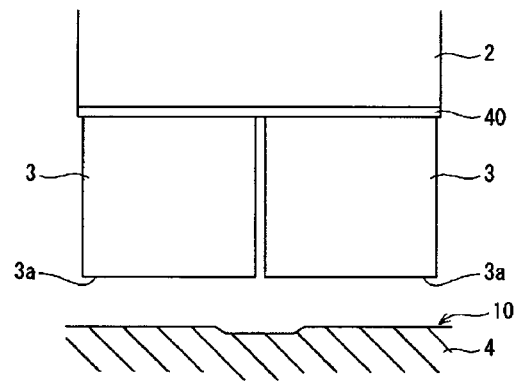
FIG. 2 is a schematic view illustrating a relationship between a pair of horns and an anvil according to an embodiment of the present invention.

As shown in FIG. 2, the pair of horns 3 are arranged with a predetermined interval (for example, 1 mm interval) in a seal direction and supported by a single converter 2. The horns may also be configured to be each supported by individual converters. The pair of horns 3 are supported by the converter 2 via an O-ring 40 at a nodal point position at which amplitude in the vertical direction becomes 0 (zero).

Figure 3:
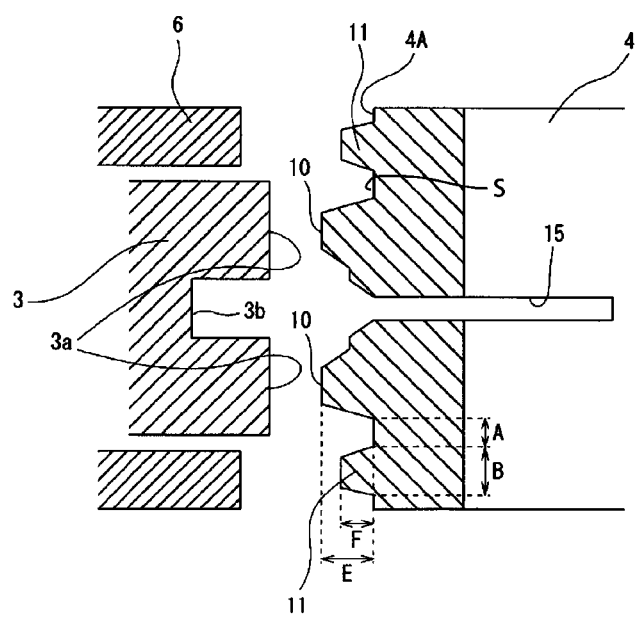
FIG. 3 is a partial enlarged view of FIG. 1 illustrating a shape of ends of the horn and the anvil.

The present embodiment illustrates an example in which two rows of seals on the upper and lower sides are formed at the same time. That is, in this example, an upper opening of a preceding paper container and a lower end of a subsequent paper container are simultaneously sealed. Accordingly, the end of each horn 3 is bifurcated, and an end face of each branch has a vibration applying surface 3a as shown in FIG. 3. Each vibration applying surface 3a has a strip shape (or rectangular strip shape) such that two rows of vibration applying surfaces 3a extend parallel to each other. In FIG. 1, the two rows of vibration applying surfaces 3a extend in a direction perpendicular to the sheet of drawing. That is, in FIG. 1, the pair of horns 3 are also arranged in a direction perpendicular to the sheet of drawing. Further, between the two rows of vibration applying surfaces 3a is a groove 3b.

The end face of the anvil 4 constitutes an abutment surface 4A which faces the horn 3. A welding surface 10 on the abutment surface 4A and the vibration applying surface 3a on the end face of the horn 3 cooperate with each other to clamp a laminate composed of two or more sheets with a predetermined load in the thickness direction.

That is, the abutment surface 4A is provided with two rows of welding surfaces 10 projecting toward the respective vibration applying surfaces 3a. The respective welding surfaces 10 face the corresponding vibration applying surfaces 3a with the laminated sheets interposed therebetween.

In the present embodiment, as shown in an enlarged view of FIG. 3, the width of each welding surface 10 (width facing the vibration applying surface 3a via a laminate) is smaller than the width of the vibration applying surface 3a.

Further, on the side of the strip-shaped welding surface 10, an array of the plurality of block members 11 is provided. The array of the plurality of block members 11 extends in an extending direction of the welding surface 10 while adjacent block members 11 are spaced from each other.

Although the plurality of block members 11 may be provided on both sides of each welding surface 10, the arrays of the plurality of block members 11 according to the present embodiment are provided with two rows of welding surfaces 10 interposed therebetween. The block member 11 has a height lower than the height of the welding surface 10, or a top of the block member 11 is flush with the end face of the welding surface 10.

FIG. 3 illustrates an example in which the vibration applying surface 3a in a stationary state and the block member 11 are not overlapped with each other when viewed in an extending direction of the block member 11 (direction in which a laminate is clamped between the horn 3 and the anvil 4). However, when the vibration applying surface 3a in a stationary state and the block member 11 are overlapped with each other, the height of the block member 11 is preferably smaller than the height of the welding surface 10.

Figure 4:
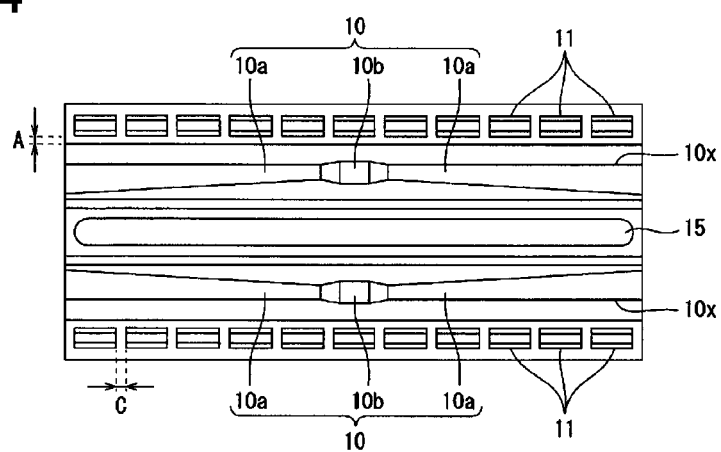
FIG. 4 is a schematic plan view illustrating left and right welding surfaces and arrays of block members.

As shown in FIG. 4, the plurality of block members 11 are arrayed in the extending direction of the welding surface 10.

Figure 5:
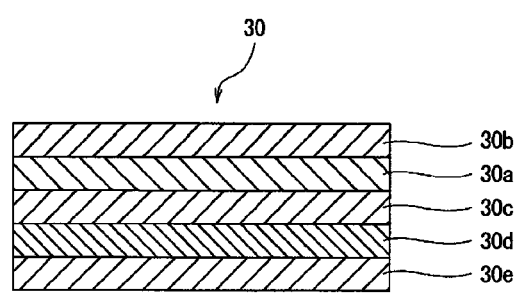
FIG. 5 is a view illustrating a layer structure of a packaging material.

As shown in FIG. 5, for example, a packaging material 30 (sheet member) which constitutes a container includes a substrate layer 30a made of paper, an exterior resin layer 30b disposed on the front surface of the substrate layer 30a, and a resin film 30c, a barrier layer 30d, and an interior resin layer 30e disposed in this order on the rear surface of the substrate layer 30a. Examples of the resin used for the exterior resin layer 30b, the resin film 30c, and the interior resin layer 30e include, but are not limited to, a polyethylene resin. However, at least the interior resin layer 30e is made of thermoplastic resin. The barrier layer 30d is composed of a deposition film deposited on the resin film 30c, an aluminum thin plate or the like to ensure barrier properties suitable for the contents to be accommodated.

As shown in FIGS. 6A and 6B, the packaging material 30 is formed into a tubular packaging material 31 by overlapping the end portions with each other with the interior resin layer 30e inward. This tubular packaging material 31 has an elongated tubular shape. Here, a portion in which an end portion 31a and an end portion 31b of the packaging material 30 are bonded to each other to form the tubular packaging material 31 is referred to as an overlapped portion R. The overlap portion R extends in the axial direction of the elongated tubular packaging material 31.

As shown in FIG. 6B, an edge protection tape 32 is adhered to the overlapped portion R. The edge protection tape 32 is adhered to the inner surface of the tubular packaging material 31.

The tubular packaging material 31, at least when sealed, is collapsed into a flat shape as shown in FIG. 6B. The tubular packaging material 31 is pressed between the horn 3 and the anvil 4 from the upper and lower sides in the sheet of FIG. 6B such that packaging materials 30A and 30B, which constitute the sheet member, are overlapped to form a two-layered laminate at a sealed position. However, at the overlapped portion R, four sheet members including the edge protection tape 32 are overlapped.

Thus, since a large number of sheet members are laminated at the overlapped portion R, a recess 10b corresponding to lamination is formed, as shown in FIG. 4, at the center part of the welding surface 10 in the longitudinal direction, which is to be in contact with the overlapped portion.

The recess 10b is the center of the seal area. Further, each of two rows of welding surface 10 include left and right welding surfaces 10a which extend leftward and rightward, respectively, from the recess 10b, which is the center of the seal area. The left and right welding surfaces 10a each have an area per unit length in the extending direction, which continuously or step-wisely increases with an increase in distance from the recess 10b (center of the seal area, which is a region where two vibration applying surfaces 3a are adjacent to each other).

For example, the shape of sealing surfaces of the left and right welding surfaces 10a has a width which continuously or step-wisely increases with an increase in distance from the center of the seal area.

Figure 7A:
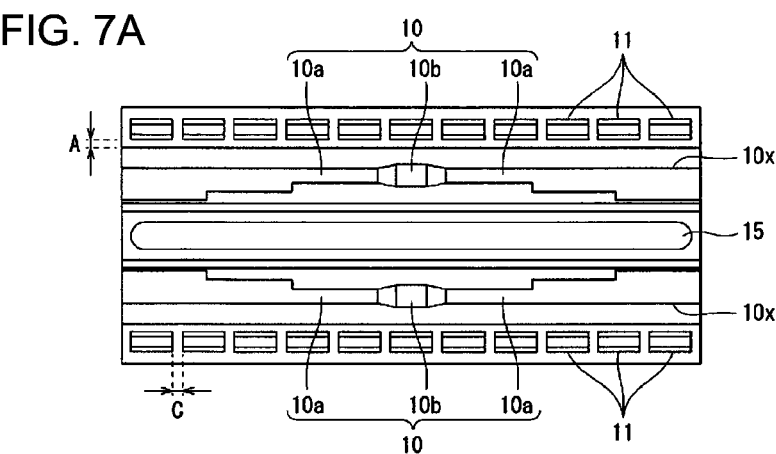
FIGS. 7A and 7B are schematic plan views illustrating another seal shape on the left and right welding surfaces.
Figure 7B:
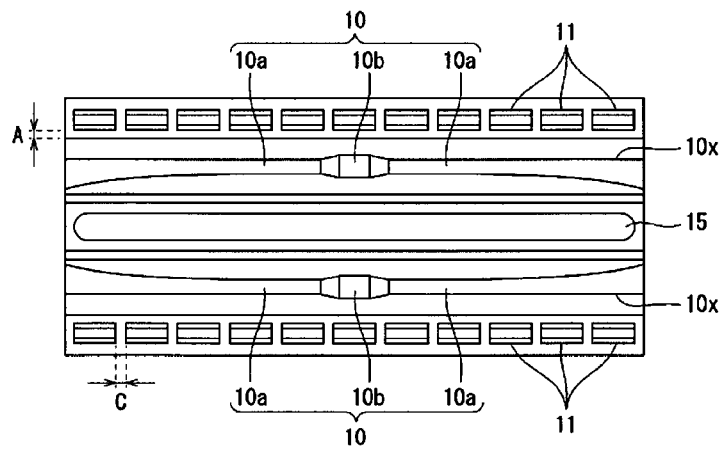

The present embodiment illustrates an example, as shown in FIG. 4, in which the shape of sealing surfaces of the left and right welding surfaces 10a is a trapezoidal shape which continuously widens with an increase in distance from the center of the seal area. The widths of the left and right welding surfaces 10a may also step-wisely increase as shown in FIGS. 7A and 7B (see FIG. 7A). Further, the profiles on both sides in the width direction are not limited to straight lines, and may also be curved lines with the width of the welding surfaces 10a continuously increasing (see FIG. 7B).

It is preferred that the left and right welding surfaces 10a have a constant distance relative to the array of block members 11 on the outside. Accordingly, in the present embodiment, only the inner profiles of the left and right welding surfaces 10a are angled such that the left and right welding surfaces 10a have a trapezoid shape which continuously widens with an increase in distance from the center of the seal area. Since only one side of the left and right welding surfaces 10a is angled, designing of the welding surfaces 10a is easy. Thus, in the shape of sealing surface of each welding surface 10a, a profile 10x adjacent to the plurality of block members 11 is designed as a straight line having a constant distance relative to the adjacent array of the plurality of block members 11.

In the above description, as shown in FIG. 4, the block members 11 are spaced from the welding surface 10 by a constant distance. However, this is merely an example. For example, at the overlapped portion R, a relatively increased amount of melted thermoplastic resin tends to be generated in sealing. Therefore, at this position, a distance from the welding surface 10 to the block member 11 is preferably larger than a distance A at the remaining positions.

In addition, a gap between the adjacent block members 11 is, for example, in the range of 0.1 mm or more and 2 mm or less.

This is because a gap of less than 0.1 mm may be insufficient to form a gap for air escape between the sheet members, and a gap of more than 2 mm may cause the melted resin to migrate outward.

Further, as shown in FIGS. 1 and 4, a groove that forms a knife slit 15, in which a cutting blade 7 is movable forward and backward, is disposed between two rows of welding surfaces 10. The cutting blade 7 is movable forward and backward relative to the horn 3, and is used to cut between the two rows of sealing positions to thereby separate the preceding paper container and the subsequent paper container.

(Operation and Others)

FIG. 1 illustrates a state in which the brick-shaped paper container for liquids, which has been sealed at the lower end thereof and filled with liquid contents, is about to be sealed at an opening (upper end) thereof while the lower end of the subsequent container is simultaneously about to be sealed.

In the state shown in FIG. 1, the tubular packaging material 31 is clamped between the vibration applying surfaces 3a of the pair of horns 3 and the abutment surface 4A of the anvil 4 from both sides with a predetermined load so that the tubular packaging material 31 is collapsed to form a laminate composed of the laminated sheet members. As the vibration applying surface 3a of the horn 3 produces ultrasonic vibration, the interior resin layer 30e is melted to create seals at two rows of sealing positions, which extend in the direction perpendicular to the sheet of the drawing.

Figure 8A:
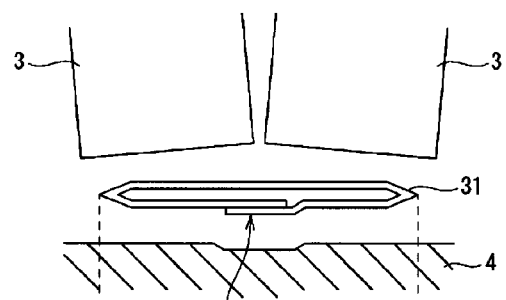
FIGS. 8A and 8B a set of views illustrating a position of the horns in sealing and an example of seal surface pressure distribution during the sealing, in which 8A illustrates an inverted V-shape position of the pair of horns, and 8B illustrates an example of surface pressure distribution in a seal direction.

Since the overlapped portion R, in which a large number of sheet members are laminated, is disposed at the center of the seal area and clamped between the vibration applying surfaces 3a of the pair of horns 3 and the welding surface 10 of the anvil 4 at a predetermined pressure, a relatively increased load is applied to the center of the seal area. Here, since the pair of horns 3 are supported via the O-ring 40, elastic deformation of the O-ring 40 causes each of the pair of horns 3 to be inclined leftward and rightward while the ends facing the converter 2 are separated from each other, assuming an inverted V-shape about the overlapped portion R serving as a fulcrum as shown in FIG. 8A. Accordingly, a load applied on both ends of the seal area becomes relatively large. However, an area per unit length in the left and right welding surfaces 10a increases toward an end of the seal area, which allows the pressure (force divided by area) to be reduced accordingly.

Figure 8B:
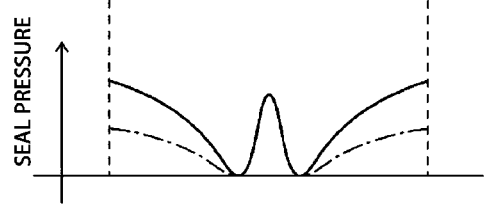

FIG. 8B shows examples of pressure distribution when the laminate is clamped between the vibration applying surface 3a of the pair of horns 3 and the abutment surface 4A of the anvil 4 in the case where the left and right welding surfaces 10a have a constant width in the length direction (solid line) and in the case where the left and right welding surfaces 10a have a width which is doubled at the end of the seal area (dot and dash line) as the present application. As seen from FIG. 8B, according to the present invention, the surface pressure applied at the end of the seal area is reduced to approximately half as represented by the pressure distribution indicated by the dot and dash line compared with that indicated by the solid line.

Thus, in the present embodiment, the surface pressure in the longitudinal direction of the seal approaches a uniform distribution, and thus the sealing properties of the present embodiment are improved.

When sealing is completed, the cutting blade 7 is inserted to sever the packaging material between two rows of sealing positions. Thus, while the sealing of the current container is completed, the lower end of the subsequent container located above is simultaneously sealed.

Further, when the tubular packaging material 31 is pressed between the vibration applying surface 3a of the horn 3 and the abutment surface 4A of the anvil 4 from both sides, the packaging material 30B facing the anvil 4 deforms along the shape of the abutment surface 4A of the anvil 4. At the sealing position between the vibration applying surface 3a and the welding surface 10, two overlapped packaging materials 30A and 30B are in close contact with each other while a space S extends along the side of the sealing position. The cross-sectional shape of the space S is defined by the distance from the welding surface 10 to the block member 11 and the height of the block member 11.

Here, since there are gaps between the plurality of block members 11, the above strip-shaped space S does not become a closed space. Further, gaps communicating with the outside are likely to be formed between two packaging materials 30 at positions between the block members 11.

In this configuration, as the vibration applying surface 3a of the horn 3 produces ultrasonic vibration, thermoplastic resin located between the vibration applying surface 3a and the welding surface 10 is melted to seal (close) the tubular packaging material 31 laminated at the sealing position between the vibration applying surface 3a and the welding surface 10.

Here, when the thermoplastic resin located between the vibration applying surface 3a and the welding surface 10 is excessive, part of the melted thermoplastic resin is laterally extruded from the sealing position at a predetermined pressure.

The extruded thermoplastic resin flows into the strip-shaped space S, but is prevented from further migrating outward due to the arrays of the plurality of block members 11. That is, migration of the extruded thermoplastic resin is blocked by the arrays of the plurality of block members 11.

In addition, when the melted thermoplastic resin flows into the space S at a predetermined pressure, air present in the space S escapes outward through the gaps between the block members 11, and thus depressurization is performed. Accordingly, the melted thermoplastic resin can be prevented from being contaminated by air which has migrated into the space S. That is, breakage of a lump of melted resin due to air contamination into the lump of melted resin can be prevented.

Further, the lump of melted resin can be formed in conformity with the shape of the space S. That is, defects in the shape of thermoplastic resin can be prevented.

Thus, the thickness and width of lump of melted resin of the extruded thermoplastic resin can be controlled by the arrays of the plurality of block members 11. Accordingly, even if thermoplastic resin is excessively melted, formation of a lump of melted resin with an irregular shape, which is easily peeled off, can be prevented.

According to the present embodiment, in the trapezoid of the left and right welding surfaces 10a, the side located on the outer side of the anvil 4 (adjacent to the paper container) and the side located on the severing side adjacent to the knife slit 15 have different shapes. The side of the trapezoid adjacent to the paper container is a straight line extending parallel with the knife slit 15, and the side on the severing side is an angled straight line. The reason for this is that blocks or the like are disposed on the outer side of the anvil 4 (adjacent to the paper container) to prevent excess resin from being introduced into the accommodated contents when melted thermoplastic resin is extruded.

Figure 9:
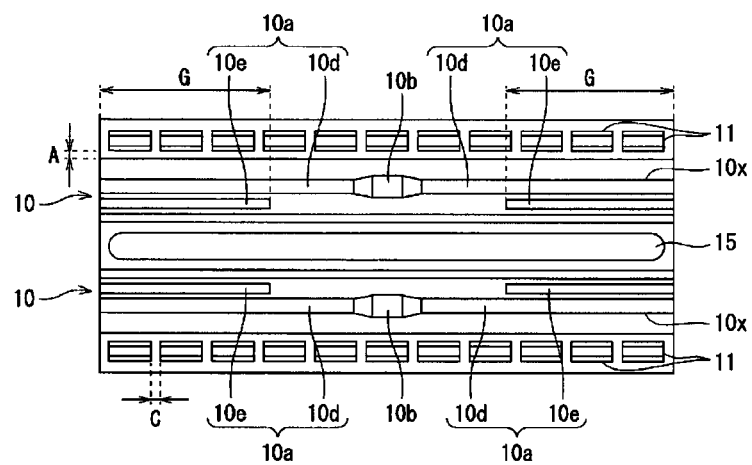
FIG. 9 is a schematic plan view illustrating another seal shape on the left and right welding surfaces.

The above description has been described an example in which the left and right welding surfaces 10a in a strip shape have a width which continuously or step-wisely increases with an increase in distance from the recess 10b. Embodiments of the invention are not limited to this configuration. For example, the left and right welding surfaces 10a may be composed of a main welding surface 10d having a strip-shape with a constant width as in the case of a conventional art, and an auxiliary welding surface 10e separately provided from the main welding surface 10d and extending along the side of the main welding surface 10d. An area per unit length in the respective welding surfaces 10a in the extending direction may be designed to continuously or step-wisely increase by an area of the auxiliary welding surface 10e with an increase in distance from the center of the seal area. The main welding surface 10d and the auxiliary welding surface 10e have the same height. The above example is shown in FIG. 9. FIG. 9 is an example in which an area per unit length step-wisely increases.

FIG. 9 illustrates an example in which the strip-shaped auxiliary welding surface 10e is each disposed on both ends of each of the left and right welding surfaces 10a. A region G for an auxiliary section, in which the auxiliary welding surface 10e is provided, is for example a region located on the side of the main welding surface 10d from an outer end of the corresponding main welding surface 10d to within two-thirds of the length of the corresponding main welding surface 10d in the extending direction. The auxiliary welding surface 10e may be provided at any position in the region G, and may also be aligned with the outer end of the main welding surface 10d and extend from the outer end to within one-third of the length in the longitudinal direction, for example.

Figure 10:
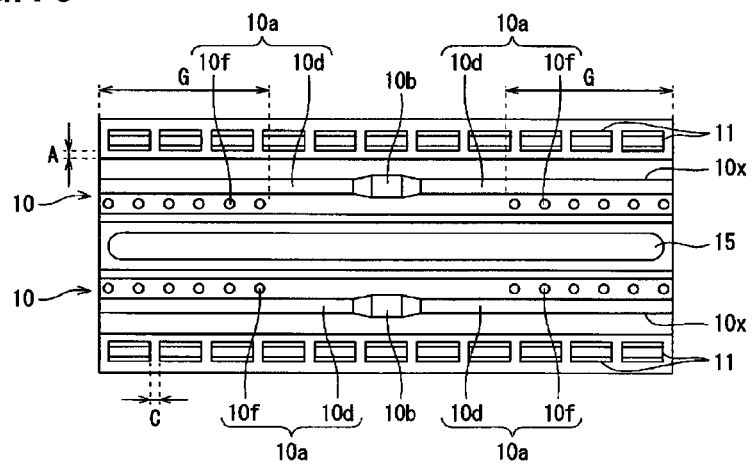
FIG. 10 is a schematic plan view illustrating another seal shape on the left and right welding surfaces.

The auxiliary welding surface 10e is desirably disposed on a side of the main welding surface 10d adjacent to the knife slit 15. The width of the strip-shaped auxiliary welding surface 10e may be constant in the longitudinal direction or may increase toward the end of the seal area. Further, as shown in FIG. 10, the auxiliary welding surface 10e may be composed of one or more protrusions 10f arranged along the main welding surface 10d in the region G for an auxiliary section. That is, the auxiliary welding surface 10e may not necessarily be a continuous form. FIG. 10 is an example in which an area per unit length step-wisely increases.

Although the present invention is described with reference to the above embodiments, the scope of the present invention is not limited to the exemplary embodiments, which are illustrated and described above, and includes all embodiments that achieve the effects equivalent to those directed by the present invention. Furthermore, the scope of the present invention is not limited to the combination of the features of the invention defined in the claims, but can be defined by various desired combinations of specific features of all the features disclosed herein.

REFERENCE SIGNS LIST

1: Ultrasonic sealing apparatus; 2: Converter; 3: Horn; 3a: Vibration applying surface; 4: Anvil; 4A: Abutment surface; 5: Jaw; 6: Horn cover; 7: Cutting blade; 9: Ultrasonic generator; 10: Welding surface; 10a: Left/right welding surface; 10b: Recess; 10d: Main welding surface; 10e: Auxiliary welding surface; 10f: Protrusion; 11: Block member; 15: Knife slit; 30: Packaging material; 31: Tubular packaging material.

What is claimed is:

1. An anvil in an ultrasonic sealing machine in which a pair of horns each having a strip-shaped vibration applying surface formed on an end face are arranged in an extending direction of the vibration applying surface, and the vibration applying surfaces of the pair of horns and a welding surface on an abutment surface formed on an end face of the anvil cooperate with each other to clamp a laminate composed of two or more sheet members having a thermoplastic resin layer so as to melt a thermoplastic resin in the sheet members by using ultrasonic vibration transmitted to the vibration applying surfaces to thereby bond the laminate, wherein the welding surface includes left and right welding surfaces which are disposed in the extending direction of the vibration applying surface, and each protrude toward the horns to face the corresponding vibration applying surfaces on the pair of horns, and the left and right welding surfaces have an area per unit length in the extending direction, which continuously or step-wisely increases with an increase in distance from a center of a seal area, which is a region where the vibration applying surfaces of the pair of horns are adjacent to each other, wherein the left and right welding surfaces each have a shape with a width which continuously or step-wisely increases with an increase in distance from the center of the seal area and wherein in the ultrasonic sealing machine each end face of the pair of horns has two rows of vibration applying surfaces arranged with a predetermined interval, and the end face of the anvil has two rows of welding surfaces corresponding to the two rows of vibration applying surfaces, wherein the abutment surface has arrays of a plurality of block members disposed on both sides with the two rows of welding surfaces interposed therebetween, and the block members are spaced from each other and are arranged in a same direction as an extending direction of the welding surface, and the plurality of block members have a height not more than the height of the welding surface, and, in a shape of each sealing surface of the left and right welding surfaces, a profile adjacent to the plurality of block members is designed as a straight line having a constant distance relative to an adjacent array of the plurality of block members.

2. The anvil of claim 1, wherein the left and right welding surfaces are composed of a main welding surface in a strip shape and an auxiliary welding surface separately provided from the main welding surface and extending along a side of the main welding surface, and an area per unit length in the respective welding surfaces in the extending direction is designed to continuously or step-wisely increase by an area of the auxiliary welding surface with an increase in distance from the center of the seal area.

3. An ultrasonic sealing apparatus for sealing an opening of a container accommodating liquid or solid contents therein, the ultrasonic sealing apparatus comprising the anvil of claim 1.

* * * * *